US012695801B2

(12) United States Patent     (10) Patent No.:    US 12,695,801 B2

Krishna et al.           (45) Date of Patent:      Jul. 28, 2026

(54) ADAPTIVE CONNECTION POOLING FOR MULTI-TENANT APPLICATIONS

(71) Applicant: Micro Focus LLC, Wilmington, DE (US)

(72) Inventors: Vamsi Krishna, Bangalore (IN); Kalyan Koka, Bengaluru (IN)

(73) Assignee: Micro Focus LLC, Wilmington, DE (US)

( * ) Notice: Subject to any disclaimer, the term of this patent is extended or adjusted under 35 U.S.C. 154(b) by 0 days.

(21) Appl. No.: 18/813,015

(22) Filed: Aug. 23, 2024

(65) Prior Publication Data

US 2026/0059016 A1     Feb. 26, 2026

(51) Int. Cl.
| | |
|---|---|
| *H04L 41/16* | (2022.01) |
| *H04L 67/104* | (2022.01) |
| *H04L 67/563* | (2022.01) |

(52) U.S. Cl.
CPC .......... *H04L 67/1053* (2013.01); *H04L 41/16* (2013.01); *H04L 67/563* (2022.05)

(58) Field of Classification Search
CPC .... H04L 67/1053; H04L 41/16; H04L 67/563
USPC ........................................................ 709/224
See application file for complete search history.

(56) References Cited

U.S. PATENT DOCUMENTS

| | | | | |
|---|---|---|---|---|
| 11,966,396 | B1 * | 4/2024 | Finnerty ............. | G06F 16/2433 |
| 12,222,938 | B1 * | 2/2025 | Seck ................... | G06F 16/2453 |
| 2024/0096312 | A1 * | 3/2024 | Gupta ................... | G10L 15/063 |
| 2024/0212086 | A1 * | 6/2024 | Gupta .................. | G06Q 50/265 |
| 2025/0045558 | A1 * | 2/2025 | Mohanty ................. | G06N 3/04 |
| 2025/0217215 | A1 * | 7/2025 | Hursh ..................... | G06F 9/547 |
| 2025/0245721 | A1 * | 7/2025 | Jadhav ................... | G06N 5/022 |

OTHER PUBLICATIONS

"PgBouncer Features," PgBouncer, 2024, 3 pages [retrieved online from: www.pgbouncer.org/features.html].
"Shared Pool Support for Multitenant Data Sources," Oracle, Oct. 2024, 16 pages [retrieved online from: docs.oracle.com/en/database/oracle/oracle-database/23/jjucp/shared-pool-for-multitenant-data-sources.html#GUID-4945D8A0-7607-43BE-9F5C-A7CD526EFE46].

* cited by examiner

*Primary Examiner* — Karen C Tang
(74) *Attorney, Agent, or Firm* — Sheridan Ross P.C.

(57) ABSTRACT

Communication connections with databases, such as when deployed as a database layer of a system architecture, are resource intensive to establish, take down, and maintain. However, from the applications' perspective, deployed in a business logic layer, more database connections result in less delay interacting with the databases. In order to optimize system resources, systems and methods are disclosed that create an optimized number of database connections and/or application connections, that are then maintained and shared by the applications via a proxy intercepting the communications and forwarding the communications to the database via the optimized number of pooled database connections. The connections may be multiplex so that simultaneous communications may be hosted concurrently.

11 Claims, 6 Drawing Sheets

ADAPTIVE CONNECTION POOLING FOR MULTI-TENANT APPLICATIONS

FIELD OF THE DISCLOSURE

The invention relates generally to systems and methods for database connectivity management and particularly to establishing and maintaining a pool of database connections.

BACKGROUND

Multi-tenant database architecture allows for discrete collections of users, such as business enterprises, to access their data without solely allocating all the hardware and software used to access the data. The hardware and software are instead shared with other tenants. As a result, the system resources are allocated across multiple tenants for better utilization of those resources and cost and administrative savings for each individual tenant.

However, sharing resources increases the risk of exposing one tenant's data to another tenant. While sharing resources reduces costs, performance may degrade, and even with careful management and configuration, the risks associated with inadvertent data exposure increase.

SUMMARY

A three-layered architecture is commonly utilized to provided data storage. The application layer, which is the topmost layer, handles user interactions and executes business logic. Sharing the application layer offers tenants cost benefits and simplifies updates. The business data access layer bridges the application and database layers by translating business requests into database queries. Sharing the business data access layer can be risky, raising data privacy and security concerns. The database layer is the sacred vault where tenant data resides. While sharing the database layer offers cost effectiveness, isolation becomes paramount for privacy compliance and ensuring data integrity.

Each database interaction involves a resource-intensive journey requiring transport level security (TLS), authentication, authorization, query parsing, and connection setup. In high-traffic scenarios, this becomes a performance bottleneck and potentially makes an application unusable.

Many applications use connection pooling which pre-establishes a "pool" of open connections, which eliminates the need for repeated setups and costly tear down. However, pre-establishing the connection pools is dependent on the type of multi tenancy being used.

In relational databases, including those offered by Amazon Web Services (AWS), such as Amazon RDS (Relational Database Service), multi-tenancy can be implemented in one of several ways to accommodate the needs of different applications and tenants. Common types of multi-tenancy in relational databases include shared schema multi-tenancy, isolated schema multi-tenancy, shared database instance multi-tenancy, and isolated database instance multi-tenancy.

With shared schema multi-tenancy, all tenants share the same database schema, but their data is logically separated within the schema. Typically, a "tenant_id" column is used in each table to distinguish data belonging to different tenants. This approach is relatively simple to implement but requires careful management to ensure data isolation and access control.

With isolated schema multi-tenancy, each tenant has its own dedicated schema within the database. This provides stronger isolation between tenants since they have separate namespaces for their data objects (tables, views, etc.). Isolated schema multi-tenancy can offer better performance and security compared to shared schema, but it may also require more resources and management overhead.

With shared database instance multi-tenancy, multiple tenants share the same database instance, but each tenant has its own separate database. This provides a higher level of isolation compared to shared schema multi-tenancy since each tenant has its own database with its own set of database users and permissions. However, it may require more resources to manage separate databases for each tenant.

With isolated database instance multi-tenancy, each tenant has its own dedicated database instance. This approach offers the highest level of isolation between tenants but may require significant resources and management overhead, especially for large-scale deployments with many tenants.

The choice of multi-tenancy model depends on factors such as the level of isolation required, performance considerations, scalability requirements, and management complexity.

With a data access layer operating within a multi-tenant system, the individual "pods" (e.g., Kubernetes units of computing) lack awareness of incoming tenant traffic. To fully leverage improved throughput capabilities, it becomes imperative to maintain separate connection pools for each tenant. For instance, having "m" replicas of a particular service within a pod and serving "n" tenants, each replica must accommodate "n" distinct connection pools tailored to each tenant's content. Furthermore, as pods dynamically auto-scale in response to shifting tenant demands, the connection pools must dynamically grow and resize in tandem with the number of replica nodes. Additionally, creating so many connection pools and closing them will burden the database service as establishing connection requires significant computing and networking resources.

These and other needs are addressed by the various embodiments and configurations of the present invention. The present invention can provide a number of advantages depending on the particular configuration. These and other advantages will be apparent from the disclosure of the invention(s) contained herein.

Systems, methods, and devices are disclosed herein that overcome the connection proliferation problem imposed by the auto expansion of replicas in pods and provide adaptive and flexible solutions.

In one embodiment, a tenant-aware proxy is provided. Existing connection pools often lack support for multi-tenant applications, inefficiently managing connections across tenants. The tenant-aware proxy pools connections both at the application side and database server without impacting the application logic.

There are two sides to the tenant-aware proxy: an incoming request from an application layer and an upstream server connection to the tenant specific database. The proxy first detects the tenant information of the incoming connection and maps it to the corresponding upstream database connection. It will then relay the data between the two connections in both directions.

In normal circumstances, the application might not get requests pertaining to all the tenants at once. Accordingly, the application and proxy will reuse the connections across multiple tenants. The application and the proxy will determine a non-intrusive protocol to convey the tenant information from the application layer to proxy. For example, when the application and the database are communicating using Java Database Connectivity (JDBC), the application repurposes the "setSchema" call of the JDBC connection to switch between various tenants based on the incoming request. If the database access protocol does not permit such a custom switchover mechanism, the application and the proxy may utilize a dedicated ""Control Plane"" connection to negotiate the switchover.

In another embodiment, adaptive pooling is disclosed. Commonly, the application's request initially comes to a load balancer or Application Programming Interface (API) gateway, then to the business layer (which may further comprise a caching layer), and finally to the data access layer. This flow of a request is leveraged in pipelining the upstream connections of the database intelligently. The proxy works with an API gateway or load balancer to understand the tenant information of the incoming requests and proactively set up upstream database connections, if the existing pool of connections is not sufficient to cater to the incoming load. At the same time, the proxy will close idle and unused connections to reduce the burden on the upstream database server when the volume of incoming requests goes down. The proxy will work with the API gateway to automatically and proactively perform database connections and, as a result, have positive impact on the overall throughput of the application.

In some embodiments, not all incoming requests result in a data access. Accordingly, the application and the proxy utilize a predetermined policy to determine the amount of expansion and contraction that should happen to the database connection pool. For example, the policy may use an extrapolation of application logic. For example, in some applications, such as those with a high degree of caching, the ratio of 10 application requests to 1 database connection might be utilized to optimize performance of the application.

In another embodiment, predictive pooling is disclosed. The proxy analyzes the traffic patterns of various clients and builds adaptive dynamic models used to provision connection pooling requests. The analysis may include data extrapolation and/or machine learning algorithms, which are used to determine the expansion and contraction of the connection pool. As a result, throughput of the applications can be further enhanced.

In another embodiment, multiplexing is disclosed. Database calls may take more time to complete as compared to the time required for an application to execute business logic. When true, multiplexing of different tenant calls is provided that use a single connection between the application and proxy. Due to the inherent nature of database transactions and locking, it is not possible to multiplex multiple database requests on the same physical connection. However, since the disclosed proxy is deployed in between, multiple tenant requests are multiplexed on a single physical connection between the application and proxy. This multiplexing does not break the paradigm of transaction-to-physical connection semantics on the database side. As a further benefit, the number of network connections in a cluster are reduced.

In some aspects, the techniques described herein relate to a method, including: intercepting, at a database interface of a proxy, communications from a plurality of applications that are directed to a database layer including a plurality of databases; analyzing the communications directed to the database layer to determine an optimized number of database connections to connect the database layer to the plurality of applications; establishing the optimized number of database connections; receiving, at an application interface of the proxy including the optimized number of database connections, communications directed to one or more of the plurality of applications received via the optimized number of database connections; and forwarding the communications directed to the one or more of the plurality of applications via the optimized number of database connections.

In some aspects, the techniques described herein relate to a method, wherein analyzing the communications directed to the database layer to determine the optimized number of database connections includes: determining a number of database requests within the communications from the plurality of applications that are directed to the database layer; and setting the optimized number of database connections in accordance with the number of database requests.

In some aspects, the techniques described herein relate to a method, wherein setting the optimized number of database connections in accordance with the number of database requests further includes incrementing the optimized number of database connections to include one database connection for every ten database requests.

In some aspects, the techniques described herein relate to a method, wherein: one of the optimized number of database connections includes communications directed to both a first application of the one or more applications and a second application of the one or more applications; and wherein forwarding, by the proxy, a first communication of the communications directed to the first application of the one or more applications and a second communication of the communications directed to the second application of the one or more applications.

In some aspects, the techniques described herein relate to a method, wherein analyzing the communications directed to the database layer to determine the optimized number of database connections to connect the database layer to the plurality of applications includes: generating a prompt including the communications directed to the database layer; analyzing the communications directed to the database layer to determine the optimized number of database connections, and return the optimized number of database connections; and providing the prompt to an artificial intelligence (AI) and receive the optimized number of database connections therefrom.

In some aspects, the techniques described herein relate to a method, wherein analyzing the communications directed to the database layer to determine the optimized number of database connections to connect the database layer to the plurality of applications, includes providing the communications to an artificial intelligence (AI) trained to receive communications and determine therefrom the optimized number of database connections.

In some aspects, the techniques described herein relate to a method, wherein analyzing the communications directed to the database layer to determine the optimized number of database connections to connect the database layer to the plurality of applications, includes determining, based on the communications directed to the database layer that determines a current resource score for a current number of database connections to connect the database layer to the plurality of applications and a candidate resource score including one or more of a delay imposed by the current number of database connections being shared by the plurality of applications, a delay reduction imposed by incrementing the current number of database connections being shared by the plurality of applications, a delay increase imposed by decrementing the current number of database connections being shared by the plurality of applications, a setup resource cost to increment the current number of database connections being shared by the plurality of applications, a teardown resource cost imposed by decrementing the current number of database connections being shared by the plurality of applications, and an active resource cost imposed by maintaining the current number of database connections being shared by the plurality of applications.

In some aspects, the techniques described herein relate to a method, wherein intercepting, at the database interface of the proxy, communications from the plurality of applications that are directed to the database layer further includes repurposing a setSchema call from one of the plurality of applications in accordance with one of the plurality of databases associated with the one of the plurality of applications.

In some aspects, the techniques described herein relate to a method, wherein intercepting, at the database interface of the proxy, communications from the plurality of applications that are directed to the database layer further includes executing a control pane to intercept communications from the plurality of applications that are directed to the database layer.

In some aspects, the techniques described herein relate to a method, including: intercepting, at a database interface of a proxy, communications from a plurality of applications that are directed to a database layer including a plurality of databases; analyzing the communications directed to the database layer to determine an optimized number of application connections to connect the plurality of applications to the database layer; establishing the number of application connections; receiving, at an application interface of the proxy including the optimized number of application connections, communications directed to ones of the plurality of applications received via the optimized number of database connections; and forwarding the communications directed to the database layer to the database layer via the optimized number of database connections.

In some aspects, the techniques described herein relate to a method, wherein analyzing the communications directed to the database layer to determine the optimized number of application connections, includes: determining a number of database requests within the communications from the plurality of applications that are directed to the database layer; determining a data size of a number of database responses within the communications from the plurality of applications that are directed to the database layer; and setting the optimized number of database connections in accordance with the number of database requests and the data size of the number of database responses.

In some aspects, the techniques described herein relate to a method, wherein: one of the optimized number of application connections includes communications directed to both a first application of the plurality of applications and a second application of the plurality of applications; and wherein forwarding, by the proxy, a first communication of the communications directed to the first application of the plurality of applications and a second communication of the communications directed to the second application of the plurality of applications.

In some aspects, the techniques described herein relate to a method, wherein analyzing the communications directed to the database layer to determine the optimized number of application connections to connect the database layer to the plurality of applications includes: generating a prompt including the communications directed to the database layer; analyzing the communications directed to the database layer to determine the optimized number of application connections, and return the optimized number of application connections; and providing the prompt to an artificial intelligence (AI) and receive the optimized number of application connections therefrom.

In some aspects, the techniques described herein relate to a method, wherein analyzing the communications directed to the database layer to determine the optimized number of application connections to connect the database layer to the plurality of applications, includes providing the communications to an artificial intelligence (AI) trained to receive communications and determine therefrom the optimized number of application connections.

In some aspects, the techniques described herein relate to a method, wherein analyzing the communications directed to the database layer to determine the optimized number of application connections to connect the database layer to the plurality of applications, includes determining, based on the communications directed to the database layer that determines a current resource score for a current number of application connections to connect the database layer to the plurality of applications and a candidate resource score including one or more of a delay imposed by the current number of application connections being shared by the plurality of applications, a delay reduction imposed by incrementing the current number of application connections being shared by the plurality of applications, a delay increase imposed by decrementing the current number of application connections being shared by the plurality of applications, a setup resource cost to increment the current number of application connections being shared by the plurality of applications, a teardown resource cost imposed by decrementing the current number of application connections being shared by the plurality of applications, and an active resource cost imposed by maintaining the current number of application connections being shared by the plurality of applications.

In some aspects, the techniques described herein relate to a method, wherein intercepting, at the database interface of the proxy, communications from the plurality of applications that are directed to the database layer further includes repurposing a setSchema call from one of the plurality of applications in accordance with one of the plurality of databases associated with the one of the plurality of applications.

In some aspects, the techniques described herein relate to a method, wherein intercepting, at the database interface of the proxy, communications from the plurality of applications that are directed to the database layer further includes executing a control pane to intercept communications from the plurality of applications that are directed to the database layer.

In some aspects, the techniques described herein relate to a system, including: a network connection to a network; a processor coupled to a computer memory having instructions that, when read by the processor, cause the processor to: intercept communications from a plurality of applications that are directed to a database layer including a plurality of databases; analyze the communications directed to the database layer to determine an optimized number of database connections to connect the database layer to the plurality of applications; establish the optimized number of database connections; receive communications directed to ones of the plurality of applications received via the optimized number of database connections; and forward the communications directed to the one or more of the plurality of applications to the plurality of applications via the optimized number of database connections.

In some aspects, the techniques described herein relate to a system, wherein the instructions to cause the processor to analyze the communications directed to the database layer to determine the optimized number of database connections to connect the database layer to the plurality of applications, further include instructions to cause the processor to: generate a prompt including the communications directed to the database layer; analyze the communications directed to the database layer to determine the optimized number of database connections, and return the optimized number of database connections; and provide the prompt to an artificial intelligence (AI) and receive the optimized number of database connections therefrom.

In some aspects, the techniques described herein relate to a system, wherein: one of the optimized number of database connections includes communications directed to both a first application of the one or more applications and a second application of the one or more applications; and further including instructions to cause the processor to forward a first communication of the communications directed to the first application of the one or more applications and a second communication of the communications directed to the second application of the one or more applications.

A system on a chip (SoC) including any one or more of the above aspects or aspects of the embodiments described herein.

One or more means for performing any one or more of the above or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects or aspects of the embodiments described herein, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
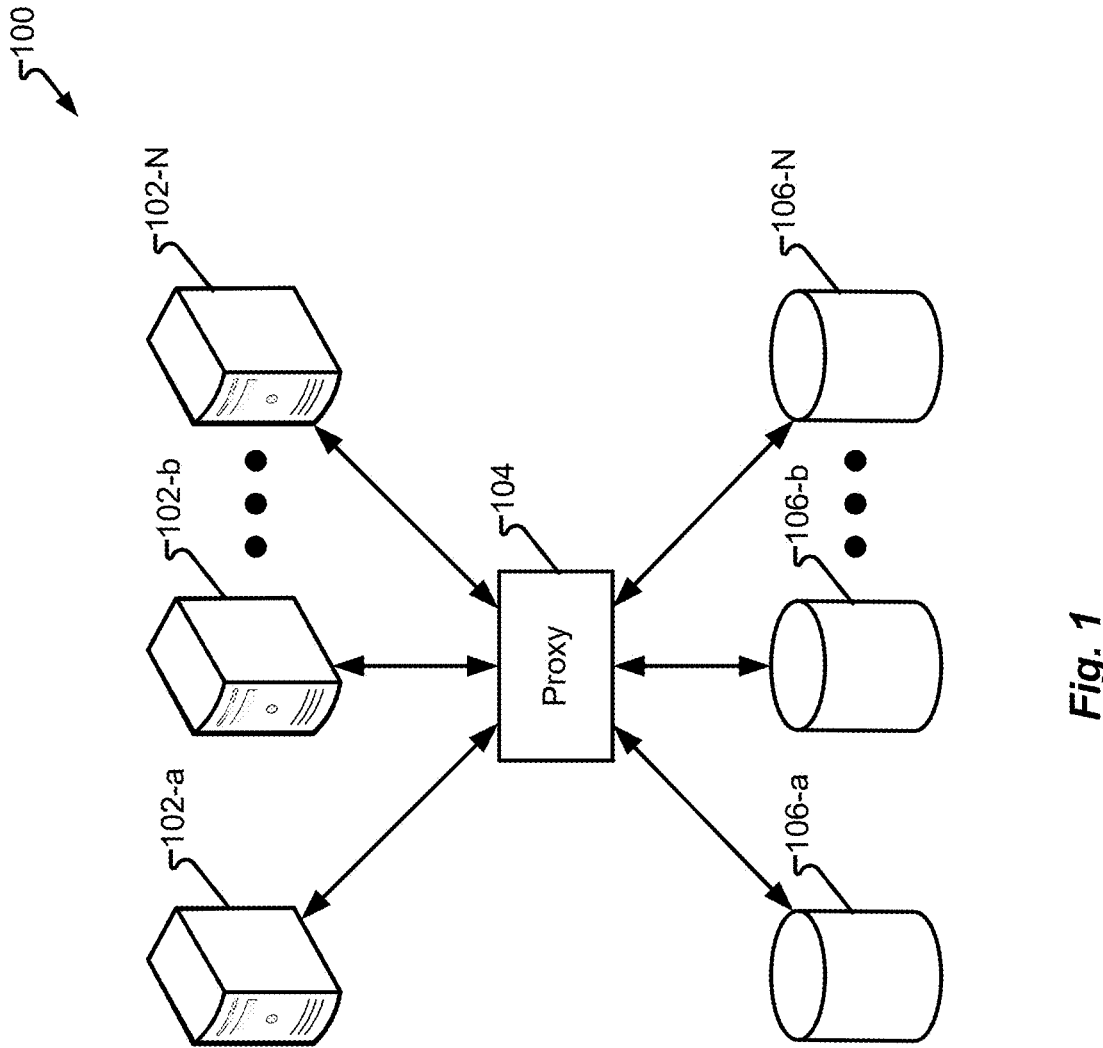
FIG. 1 depicts a system in accordance with embodiments of the present disclosure.

FIG. 1 illustrates system 100 in accordance with embodiments of the present disclosure. In one embodiment, system 100 illustrates components comprising computing components 102, 104, and 106 and plurality(ies) thereof that are interconnected, such as via a network, wherein a plurality of applications 102 (e.g., application 102-*a*, 102-*b*, through 102-N) are indirectly connected to databases 106 (e.g., database 106-*a*, 106-*b*, through 106-N).

It should be appreciated that, in one embodiment, each of the illustrated components provides a single service. However, one of ordinary skill in the art will recognize that other topologies may be deployed without departing from the scope of embodiments herein. For example, any one component may be embodied as a plurality of components and/or any two or more components may be embodied as a single component. In one embodiment, the components as illustrated perform a single function, in other embodiments, one or more components may perform a plurality of functions and/or one or more functions may be performed by a plurality of components including as a service (e.g., software as a service (SaaS)).

Connections are established, taken down, and maintained by proxy 104 rather than applications 102. Proxy 104 intercepts communications between any one or more application 102 to any one or more of databases 106 to determine an optimized number of connections to databases 106. Additionally or alternatively, proxy 104 intercepts communications between any one or more database 106 to any one or more of applications 102 to determine an optimized number of connections to the applications 102. Additionally or alternatively, proxy 104 may intercept communications by repurposing the "setSchema" calls of applications 102 to address communications to proxy 104. In another additional or alternative embodiment, a "change tenant" or "change schema" may be utilized.

In one embodiment, the optimized number of connections is determined in accordance with a policy, such as an acceptable and/or unacceptable delay for applications 102. If the delay is below a low-policy threshold, then the number of database connections may be decremented. If the delay is above a high-policy threshold, then the number of database connections may be incremented. In another embodiment, the optimized number of database connections may be determined programmatically, such as at a ratio of ten database requests per every database connection. Additionally or alternatively, determining the optimized number of database connections may be performed initially by one means, such as programmatically, and adjusted by another means, such as in accordance with a policy.

In yet another embodiment, the network traffic which may include communications to and/or from any one or more of applications 102, proxy 104, and/or database 106 are provided to an artificial intelligence (AI) for analysis. A prompt may be generated, such as by proxy 104, that includes the communications themselves and/or attributes of the communications (e.g., source, destination, volume over time, change in volume, types of calls therein, volume of data returned, time to obtain a response, etc.). The prompt may further comprise instructions to analyze the communications and/or attributes of the communications and determine the optimized number of database communications needed so that applications 102 do not experience an out-of-policy delay but without having idle database connections. Database connections may be idle for a previously determined period of time before tearing down the connection and recovering the resources. As a result, the AI may then determine the optimized number of database connections.

In another embodiment, a candidate resource score and a current resource score are determined. When the candidate resource score is less than a current resource score, the number of database connections is incremented. Additionally or alternatively, when a candidate resource score is greater than a current resource score, the number of database connections is decremented. A current resource score is a summation of the current resources being utilized to enable applications 102 to interact with databases 106. The current resource score includes a delay, such as may be caused by too few database connections with a pool of database connections between proxy 104 and databases 108. A candidate resource score determines the resource cost to add or remove one or more database connections and the savings realized by having unutilized or underutilized database connections taken down and/or the savings realized by applications 102 having less delay when interacting with databases 106. The candidate resource score may include one or more of a delay imposed by the current number of database connections being shared by the plurality of applications, a delay reduction imposed by incrementing the current number of database connections being shared by the plurality of applications, a delay increase imposed by decrementing the current number of database connections being shared by the plurality of applications, a setup resource cost to increment the current number of database connections being shared by the plurality of applications, a teardown resource cost imposed by decrementing the current number of database connections being shared by the plurality of applications, an active resource cost imposed by maintaining the current number of database connections being shared by the plurality of applications, and combinations thereof.

Embodiments herein are generally directed a plurality of applications 102 (which may be referred to as "client applications") accessing data on one or more of databases 106 via an established pool of connections, wherein the connections are established in advance of any one application 102 call being received by any one database 106.

In one embodiment, proxy 104 intercepts communications between applications 102 and databases 106. Communications with databases 106 comprise one or more database connections established and/or maintained by proxy 104. The database connections are resource intensive to establish, tear down, and maintain. Therefore, it is beneficial to system efficiency to have as few database connections as possible. In contrast, too few database connections will create a processing bottleneck for applications 102 requiring interactions (e.g., reads, rights, commits, etc.) with databases 106. Therefore, it is also beneficial to the system to have as many database connections as possible, or at least one per application 102. Determining an optimized number of database connections balances the need to maintain as few database connections as possible and perform the least number of establishing and/or tearing down operations as possible with the contradictory need for applications to have database connections readily available. Accordingly, pooling database connections provides an opportunity to leverage the connection resources with lesser impact on application performance, thereby skewing the most optimized system to a topology that has a fewer number of database connections than the number of applications 102.

In another embodiment, the optimized number of database connections is determined by analyzing communications originating from applications 102 addressed to the database layer, which may be a specific database or a conceptual layer comprising at least one database 106, and which may be intercepted by proxy 104. The analysis further comprises determining a number of database requests with the communication. Additionally or alternatively, the analysis may further include an estimation of the volume of data in the request, volume of data in the reply, time for the database 106 to process an operation encoded within the communication and/or current utilization level for a current pool of database communications and/or application communications. As a result, the analysis may determine that additional network connections are required, and increment the number of database connections by establishing one or more additional network connections and provide at least some of the communications to the database via the newly created connections. Conversely, if the number database connections is determined to be excessive, then immediately or with a delay (such as to determine that the excessive number of database connections persists for a threshold amount of time), one or more database connections are decremented such as by taking down the resources utilized to maintain the connection and allowing such resources to be made available for other purposes.

In another embodiment, a control plane may be provided, such as by proxy 104, to manage the communications between one or more applications 102 and one or more of databases 106.

Figure 2:
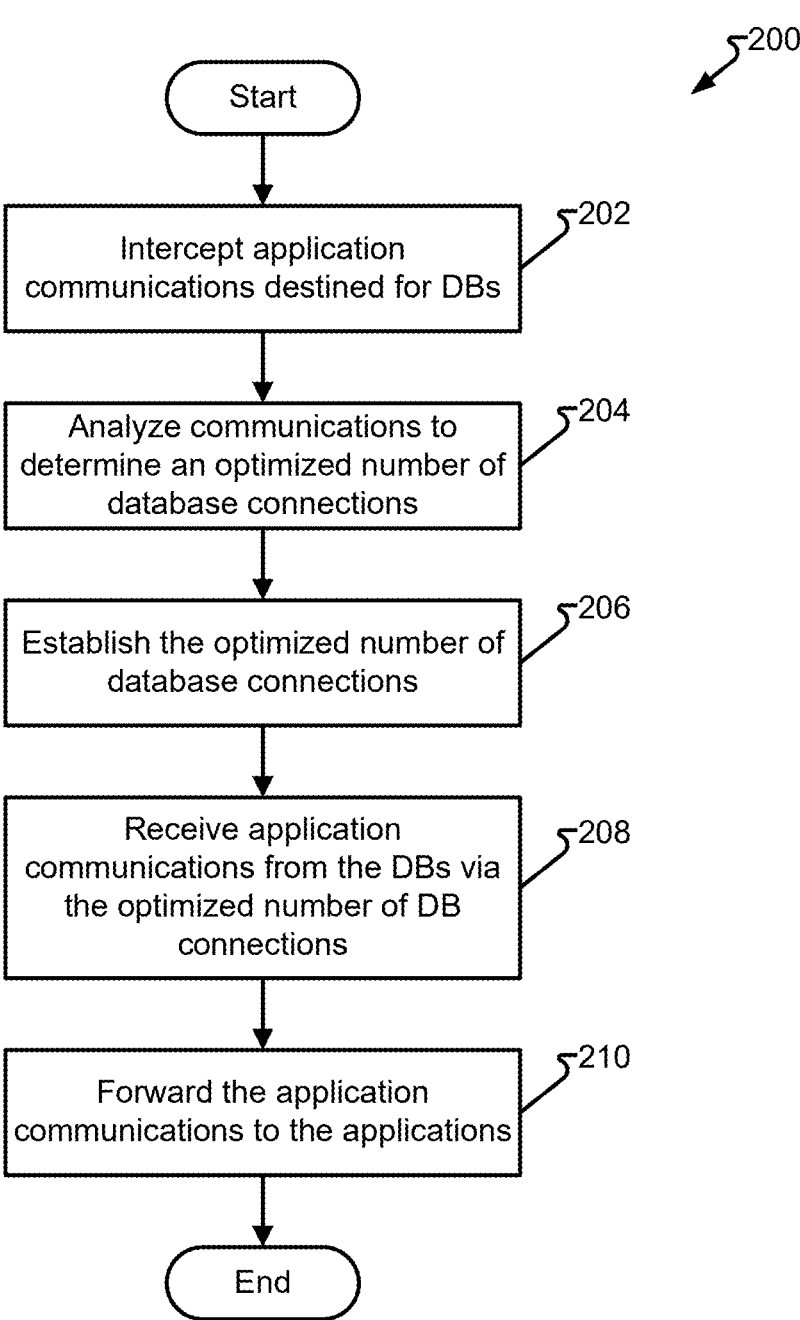
FIG. 2 depicts a process in accordance with embodiments of the present disclosure.

FIG. 2 illustrates process 200 in accordance with embodiments of the present disclosure. In one embodiment, process 200 is embodied as machine-readable instructions maintained in a non-transitory memory that when read by a machine, such as one or more processors of a server or servers, cause the machine to execute the instructions and thereby execute process 200. The processor of the server may include, but is not limited to, at least one processor of a server executing proxy 104 and/or other components (e.g., a gateway, switch, router, firewall, etc.).

Process 200 begins, and in step 202, intercepts application communication from one or more applications 102 to one or more databases 106. The interception of communications may be provided by proxy 104 in conjunction with one or more network components logically disposed between applications 102 and databases 106 (e.g., a gateway, switch, router, firewall, etc.). Alternatively, the setSchema, "change tenant", or "change schema" may be utilized.

call of applications 102 may be repurposed to communicate with proxy 104. Step 204 analyzes the communications themselves and/or attributes thereof to determine an optimized number of database connections. Step 206 then applies any adjustments, increments/decrements to establish the number of database connections in accordance with the analysis. Step 208 then receives communications via the resulting pool of optimized database connections. Step 210 then forwards the application communications to the corresponding application 102.

Figure 3:
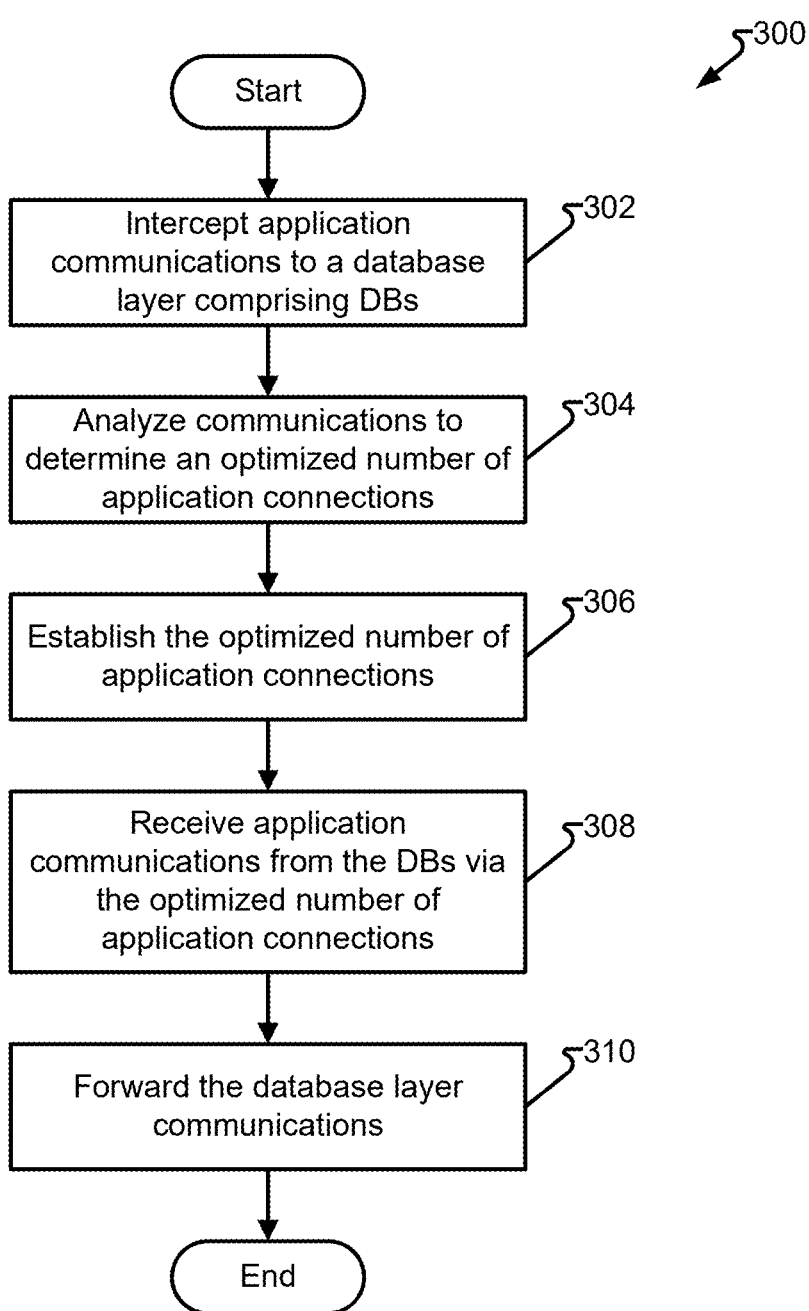
FIG. 3 depicts a process in accordance with embodiments of the present disclosure.

FIG. 3 illustrates process 300 in accordance with embodiments of the present disclosure. In one embodiment, process 300 is embodied as machine-readable instructions maintained in a non-transitory memory that when read by a machine, such as one or more processors of a server or servers, cause the machine to execute the instructions and thereby execute process 300. The processor of the server may include, but is not limited to, at least one processor of a server executing proxy 104 and/or other components (e.g., a gateway, switch, router, firewall, etc.).

In one embodiment, process 300 begins, and in step 302, intercepts application communications from one or more applications 102 to a database layer, such as one comprising one or more databases 106. The interception of communications may be provided by proxy 104 in conjunction with one or more network components logically disposed between applications 102 and databases 106 (e.g., a gateway, switch, router, firewall, etc.). Alternatively, the setSchema, "change tenant", or "change schema" may be utilized such that calls of applications 102 may be repurposed to communicate with proxy 104.

Step 304 analyzes the communications themselves and/or attributes thereof to determine an optimized number of application connections. Step 306 then applies any adjustments, increments/decrements to the number of database connections in accordance with the analysis. Step 308 then receives application communications via the resulting pool of optimized database connections. Step 310 then forwards the communications to the corresponding application 102.

Figure 4A:
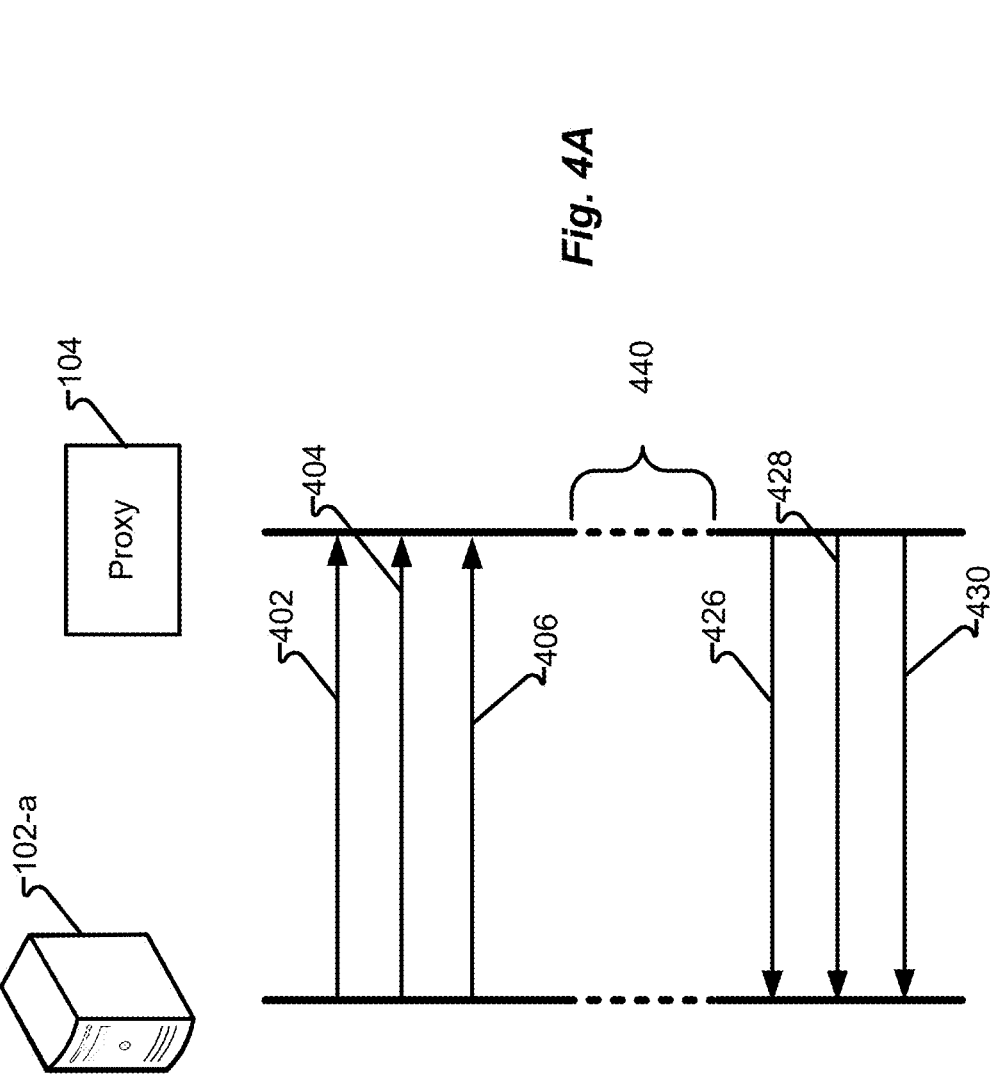
FIGS. 4A and 4B depict an interaction in accordance with embodiments of the present disclosure.
Figure 4B:
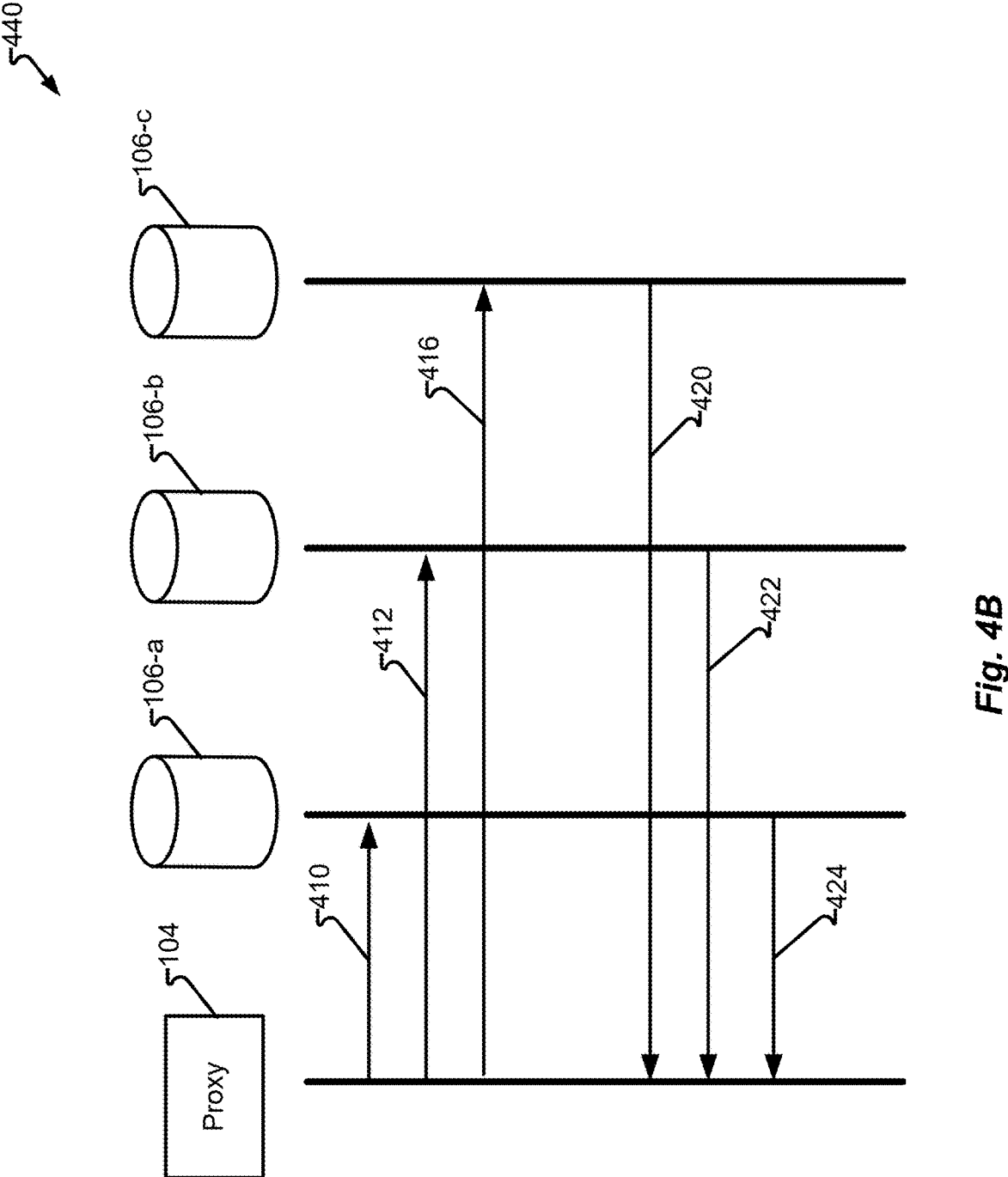

FIGS. 4A-4B depict interactions 400 and 440, respectively, in accordance with embodiments of the present disclosure. In one embodiment, a single service, such as application 102-*a*, performs three separate transactions on three separate databases, such as database 106-*a*, 106-*b*, and 106-*c*. In the prior art, application 102-*a* would open three separate network connections, one for each of the databases 106-*a*, 106-*b*, and 106-*c*. However, and in one embodiment, application 102-*a* opens a single connection is opened to proxy 104 which then multiplexes the communications on a single connection.

In one embodiment, application 102-*a*, sends message 402 "Tx1_start(Tenant1) with generatedMessage1" to activate a tenant 1 request message 404 "Tx2_start(Tenant2), with generatedMessage2" to activate a tenant 2 request; and message 406 "Tx3_start(Tenant3) with generatedMessage3" to activate a tenant 3 request. Each of messages 402, 404, and 406 are directed to one particular database, specifically database 106-*a*, database-106-*b*, and database 106-*c*, respectively. However, messages 402, 404, and 406 are delivered to proxy 104 for multiplexing and forwarding. Proxy 104 then wraps message (e.g., messages 402, 404, and 406) packets with MessageIds (internal processing).

Proxy 104, after receiving messages 402, 404, and 406, then sends messages 410, 412, and 416 to activate database 106-*a*, 106-*b*, and 106-*c*, respectively. Message 410 may comprise "Tx1 data (using JDBC/standard protocol, Tenant 1), message 412 may comprise "Tx2 data (using JDBC/standard protocol, Tenant 2); and message 416 may comprise "Tx3 data (using JDBC/standard protocol, Tenant 3). Messages 410, 412, and 416 may be sent from proxy 104 in any order, including concurrently.

In one embodiment, each response from database 106-*a*, 106-*b*, and 106-*c* indicates success, such as message 420 "Response 1 (from tenant(1))", message 422 "Response 2 (from tenant(2))" and massage 424 "Response 3 (from tenant(3))" being received by proxy 104. Messages 420, 422, and 424 may then deactivate database 106-*a*, 106-*b*, and 106-*c*, respectively.

In response, to receiving messages 420, 422, and 424, proxy 104 unwraps packets using MessageIds and sends messages 426, 428, and 430 back to application 102-*a*. Message 420 "Tx1 response data (with MessageID1)", message 422 "Tx2 response data (with MessageID2)" and "Tx3 response data (with MessageID3)". Proxy 104, in response to receiving messages 420, 422, and 424 then sends message 426 "Tx1 response data (with Message ID1), message 428 "Tx2 response data (with Message ID2); and message 426 "Tx3 response data (with Message ID3) to application 102-*a*. Messages 426, 428, and 430 may be sent in any order, including concurrently.

Additionally or alternatively, at least one failure may occur for example message 422 may be "SpecificErrorMessage (from Tenant3)" and delivered to the requestor, for example, application 102-*a*. In response, message 430 may comprise "SpecificErrorMessage (with messageID3)".

14

Figure 5:
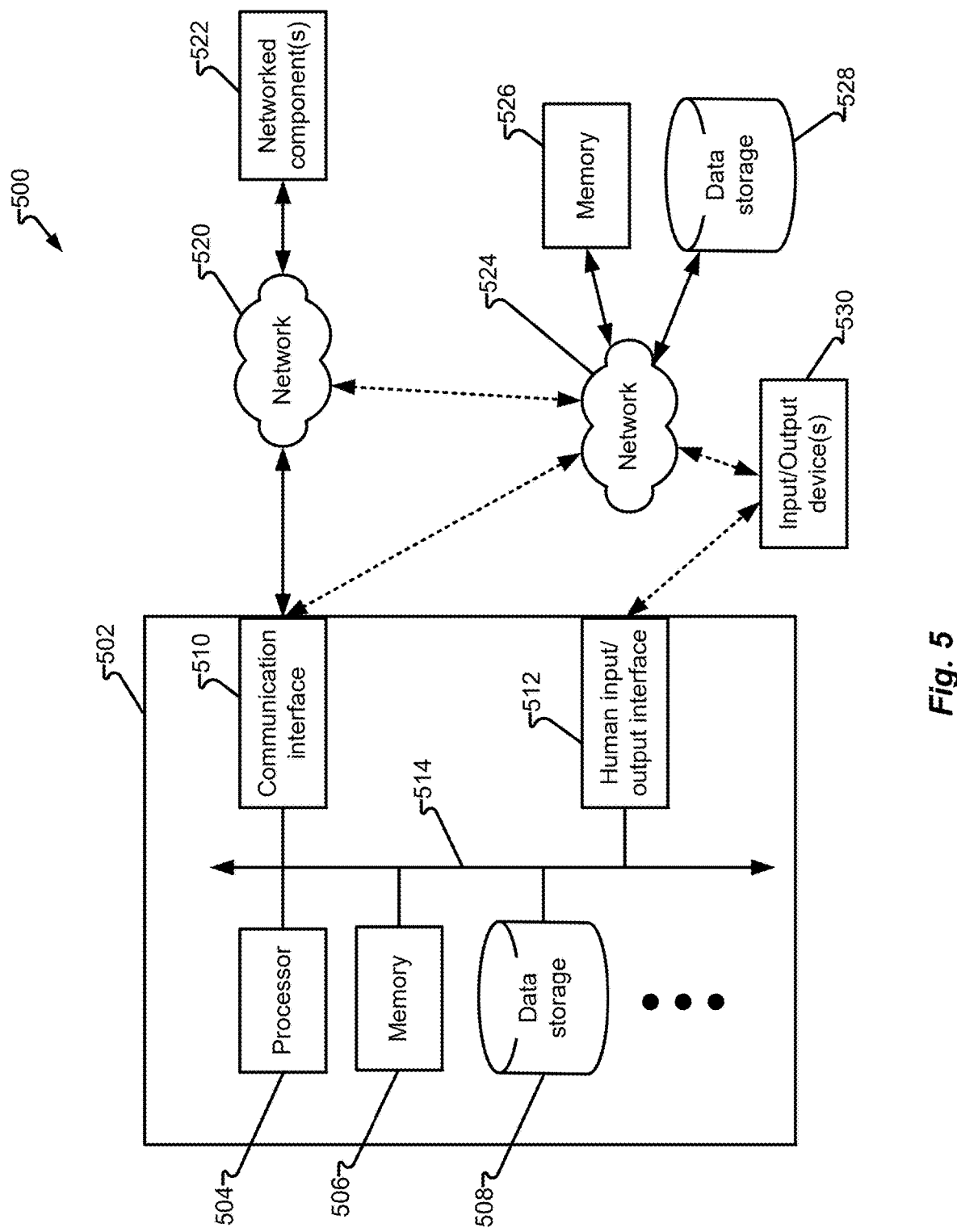
FIG. 5 depicts a system in accordance with embodiments of the present disclosure.

FIG. 5 depicts device 502 in system 500 in accordance with embodiments of the present disclosure. In one embodiment, application server running applications 102, databases 106, and/or proxy 104 may each be embodied, in whole or in part, as device 502 comprising various components and connections to other components and/or systems. The components are variously embodied and may comprise processor 504. The term "processor," as used herein, refers exclusively to electronic hardware components comprising electrical circuitry with connections (e.g., pin-outs) to convey encoded electrical signals to and from the electrical circuitry. Processor 504 may comprise programmable logic functionality, such as determined, at least in part, from accessing machine-readable instructions maintained in a non-transitory data storage, which may be embodied as circuitry, on-chip read-only memory, computer memory 506, data storage 508, etc., that cause the processor 504 to perform the steps of the instructions. Processor 504 may be further embodied as a single electronic microprocessor or multiprocessor device (e.g., multicore) having electrical circuitry therein which may further comprise a control unit(s), input/output unit(s), arithmetic logic unit(s), register (s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array within a system (e.g., blade, multiprocessor board, etc.) or distributed processing system (e.g., "cloud", farm, etc.). It should be appreciated that processor 504 is a non-transitory computing device (e.g., electronic machine comprising circuitry and connections to communicate with other components and devices). Processor 504 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 504). Processor 504 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 504, device 502 may utilize computer memory 506 and/or data storage 508 for the storage of accessible data, such as instructions, values, etc. Communication interface 510 facilitates communication with components, such as processor 504 via bus 514 with components not accessible via bus 514 and may be embodied as a network interface (e.g., ethernet card, wireless networking components, USB port, etc.). Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, speaker, microphone, still and/or video camera, etc. In another embodiment, communication interface 510 may comprise, or be comprised by, human input/output interface 512. Communication interface 510 may be configured to communicate directly with a networked component or configured to utilize one or more networks, such as network 520 and/or network 524.

Network 520 may be a wired network (e.g., Ethernet), wireless (e.g., WiFi, Bluetooth, cellular, etc.) network, or combination thereof and enable device 502 to communicate with networked component(s) 522. In other embodiments, network 520 may be embodied, in whole or in part, as a telephony network (e.g., public switched telephone network (PSTN), private branch exchange (PBX), cellular telephony network, etc.).

Additionally or alternatively, one or more other networks may be utilized. For example, network 524 may represent a second network, which may facilitate communication with components utilized by device 502. For example, network 524 may be an internal network to a business entity or other organization, whereby components are trusted (or at least more so) than networked components 522, which may be connected to network 520 comprising a public network (e.g., Internet) that may not be as trusted.

Components attached to network 524 may include computer memory 526, data storage 528, input/output device(s) 530, and/or other components that may be accessible to processor 504. For example, computer memory 526 and/or data storage 528 may supplement or supplant computer memory 506 and/or data storage 508 entirely or for a particular task or purpose. As another example, computer memory 526 and/or data storage 528 may be an external data repository (e.g., server farm, array, "cloud," etc.) and enable device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of computer memory 506, data storage 508, computer memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, a switch, a port, or other communication component such that a particular output of processor 504 enables (or disables) input/output device 530, which may be associated with network 520 and/or network 524, to allow (or disallow) communications between two or more nodes on network 520 and/or network 524. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:

intercepting, at a database interface of a proxy, communications from a plurality of applications that are directed to a database layer comprising a plurality of databases;

analyzing the communications directed to the database layer to determine an optimized number of database connections to connect the database layer to the plurality of applications;

establishing the optimized number of database connections;

receiving, at an application interface of the proxy comprising the optimized number of database connections, communications directed to one or more of the plurality of applications received via the optimized number of database connections; and forwarding the communications directed to the one or more of the plurality of applications via the optimized number of database connections, wherein analyzing the communications directed to the database layer to determine the optimized number of database connections to connect the database layer to the plurality of applications, comprises determining, based on the communications directed to the database layer that determines a current resource score for a current number of database connections to connect the database layer to the plurality of applications and a candidate resource score comprising one or more of a delay imposed by the current number of database connections being shared by the plurality of applications, a delay reduction imposed by incrementing the current number of database connections being shared by the plurality of applications, a delay increase imposed by decrementing the current number of database connections being shared by the plurality of applications, a setup resource cost to increment the current number of database connections being shared by the plurality of applications, a teardown resource cost imposed by decrementing the current number of database connections being shared by the plurality of applications, and an active resource cost imposed by maintaining the current number of database connections being shared by the plurality of applications.

2. The method of claim 1, wherein analyzing the communications directed to the database layer to determine the optimized number of database connections comprises:

determining a number of database requests within the communications from the plurality of applications that are directed to the database layer; and setting the optimized number of database connections in accordance with the number of database requests.

3. The method of claim 1, further comprising, in response to receiving the communications directed to one or more of the plurality of applications received via the optimized number of database connections, unwrapping the communications directed to one or more of the plurality of applications using a message identifier for each of the communications directed to one or more of the plurality of applications; and forwarding the communications directed to the one or more of the plurality of applications via the optimized number of database connections comprises multiplexing, by the proxy, the communications directed to the one or more of the plurality of applications.

4. The method of claim 1, wherein:

one of the optimized number of database connections comprises communications directed to both a first application of the one or more of the plurality of applications and a second application of the one or more of the plurality of applications; and wherein forwarding, by the proxy, a first communication of the communications directed to the first application of the one or more of the plurality of applications and a second communication of the communications directed to the second application of the one or more of the plurality of applications.

5. The method of claim 1, wherein analyzing the communications directed to the database layer to determine the optimized number of database connections to connect the database layer to the plurality of applications comprises:

generating a prompt comprising the communications directed to the database layer;

analyzing the communications directed to the database layer to determine the optimized number of database connections, and return the optimized number of database connections; and providing the prompt to an artificial intelligence (AI) and receive the optimized number of database connections therefrom.

6. The method of claim 1, wherein analyzing the communications directed to the database layer to determine the optimized number of database connections to connect the database layer to the plurality of applications, comprises providing the communications to an artificial intelligence (AI) trained to receive communications and determine therefrom the optimized number of database connections.

7. The method of claim 1, wherein intercepting, at the database interface of the proxy, communications from the plurality of applications that are directed to the database layer further comprises repurposing a setSchema call from one of the plurality of applications in accordance with one of the plurality of databases associated with the one of the plurality of applications.

8. The method of claim 1, wherein intercepting, at the database interface of the proxy, communications from the plurality of applications that are directed to the database layer further comprises executing a control pane to intercept communications from the plurality of applications that are directed to the database layer.

9. A system, comprising:

a network connection to a network;

a processor coupled to a computer memory having instructions that, when read by the processor, cause the processor to:

intercept communications from a plurality of applications that are directed to a database layer comprising a plurality of databases;

analyze the intercepted communications directed to the database layer to determine an optimized number of database connections to connect the database layer to the plurality of applications;

establish the optimized number of database connections;

receive communications directed to ones of the plurality of applications received via the optimized number of database connections; and forward the received communications directed to the one or more of the plurality of applications to the plurality of applications via the optimized number of database connections, wherein analyzing the communications directed to the database layer to determine the optimized number of database connections to connect the database layer to the plurality of applications, comprises determining, based on the intercepted communications directed to the database layer that determines a current resource score for a current number of database connections to connect the database layer to the plurality of applications and a candidate resource score comprising one or more of a delay imposed by the current number of database connections being shared by the plurality of applications, a delay reduction imposed by incrementing the current number of database connections being shared by the plurality of applications, a delay increase imposed by decrementing the current number of database connections being shared by the plurality of applications, a setup resource cost to increment the current number of database connections being shared by the plurality of applications, a teardown resource cost imposed by decrementing the current number of database connections being shared by the plurality of applications, and an active resource cost imposed by maintaining the current number of database connections being shared by the plurality of applications.

10. The system of claim 9, wherein the instructions to cause the processor to analyze the communications directed to the database layer to determine the optimized number of database connections to connect the database layer to the plurality of applications, further comprise instructions to cause the processor to:

generate a prompt comprising the communications directed to the database layer;

analyze the communications directed to the database layer to determine the optimized number of database connections, and return the optimized number of database connections; and provide the prompt to an artificial intelligence (AI) and receive the optimized number of database connections therefrom.

11. The system of claim 9, wherein:

one of the optimized number of database connections comprises communications directed to both a first application of the one or more of the plurality of applications and a second application of the one or more of the plurality of applications; and further comprising instructions to cause the processor to forward a first communication of the communications directed to the first application of the one or more of the plurality of applications and a second communication of the communications directed to the second application of the one or more of the plurality of applications.

* * * * *